June 1, 1937.  D. G. McIVOR  2,082,712
INSECT EXTERMINATOR
Filed June 19, 1936
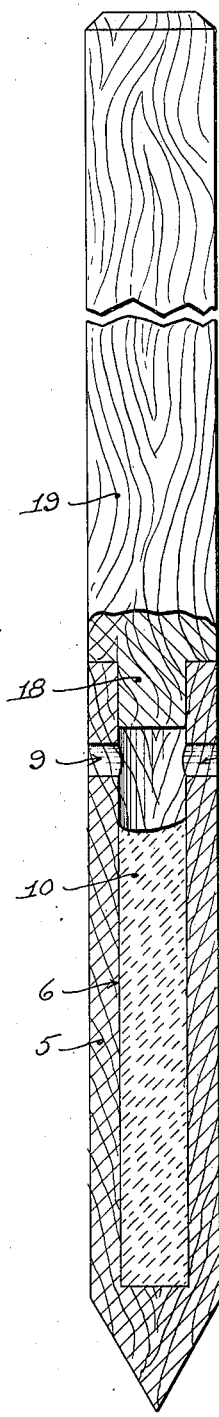
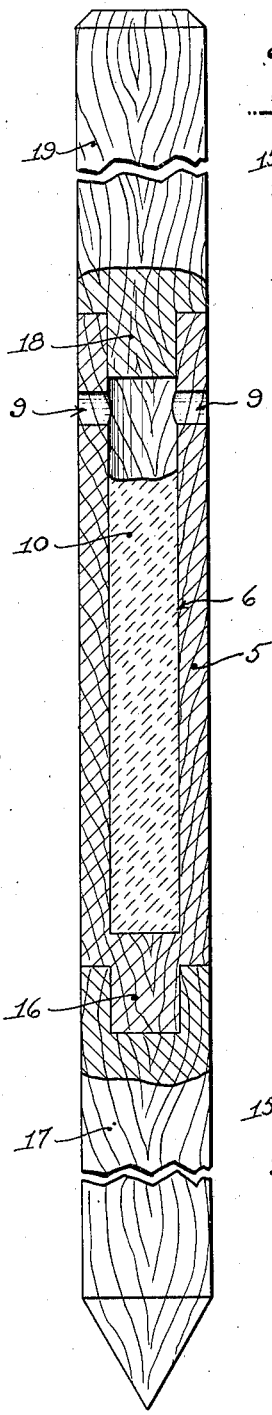
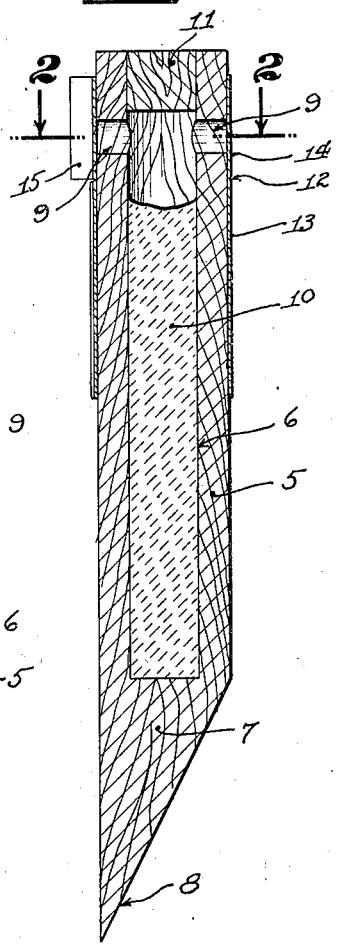
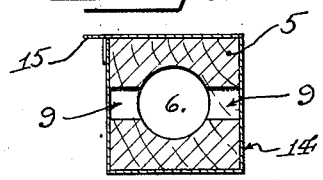
INVENTOR,
Donald G. McIvor
BY Booth & Booth,
ATTORNEYS.

Patented June 1, 1937

2,082,712

UNITED STATES PATENT OFFICE 2,082,712

INSECT EXTERMINATOR

Donald G. McIvor, Berkeley, Calif.

Application June 19, 1936, Serial No. 86,099

5 Claims. (Cl. 43—131)

The present invention relates to a container or feeder for insect poison. It may be used for the extermination or control of various kinds of insects, but for purposes of illustration it is illustrated and described herein as a device especially adapted for the poisoning of ants.

The principal object of the invention is to provide a container which can be made and sold so cheaply that it can be economically thrown away when empty, thus obviating the trouble of cleaning and re-filling. Another object is to provide a container which can be filled with poison at the factory and shipped and stored safely in sealed condition. A further object is to provide a container in which the poison is not accessible to animals or children and from which the poison cannot run out or escape, no matter what the position of the container may be. Still further objects are to provide a device which is easy to install, which will remain effective for a long time even under adverse weather conditions, and which can be combined with a flower or garden stake, so that the poison can be elevated a considerable distance above the ground to control the infestation of plants and shrubs by ants.

Other objects and advantages of the invention will be made apparent in the following specification which should be read with the understanding that the form, construction and arrangement of the various parts may be varied within the limits of the claims hereto appended, without departing from the spirit of the invention.

Reference will be made to the accompanying drawing in which

Fig. 1 is a longitudinal section of a preferred embodiment of the invention in its simplest form.

Fig. 2 is a transverse section on the line 2—2 of Fig. 1.

Figs. 3 and 4 are part sectional elevations illustrating the invention as incorporated in a garden stake.

In the drawing, the reference numeral 5 designates an elongated body preferably made of wood and provided with a longitudinal bore or cavity 6 extending from one end through the greater portion of its length. The other end is solid as shown at 7 and is exteriorly pointed as at 8. The cross sectional shape of the body is immaterial although I prefer a square section as being cheapest to manufacture. The dimensions of the body are preferably about one inch square by seven inches long.

One or more transverse holes 9 are bored through the body into the interior cavity near its upper end. The number of these holes is immaterial but I prefer, for reasons of economy, to bore straight through the body thus making two holes into the interior cavity as shown. The diameter of the holes 9 is smaller than that of the cavity 6 but large enough to permit ants to enter and leave freely.

After the body has been formed as described above, the cavity 6 is partially filled up to a level slightly below the holes 9, with a charge of poison bait material preferably in the form of a non-fluid paste. A wooden plug 11 is then driven into the end of the cavity 6, and permanently retained therein in any suitable manner such as by gluing. A strip of paper or other suitable thin material is then wrapped around the upper portion of the body and secured in position preferably by an adhesive. The strip is formed in two friably connected portions separated by a horizontal line of perforations at a point indicated at 12 below the level of the holes 9, the lower portion 13 constituting a label upon which are printed a poison notice and instructions for the use of the device, and the upper portion 14 forming a seal closing the holes 9. The upper portion 14 is preferably provided with an outwardly extending end 15 forming a tab which can be grasped and by which said upper portion can be torn off to expose and open the holes 9. If desired, the portions 13 and 14 can be made as two separate pieces, or the lower portion 13 can be omitted entirely, the label being printed directly upon the surface of the body. For manufacturing economy, however, I prefer to make the two portions in one piece as shown, with a line of perforations to facilitate tearing off the seal portion 14.

It will be seen from the foregoing that the device can be filled with poison and sealed at the factory, and can then be shipped and stored without spilling or deterioration. The user has only to tear off the sealing portion 14 of the wrapping and drive the device into the ground until the holes 9 are about an inch above ground level. Ants will be attracted by the scent of the bait, and can enter and leave through the holes 9, feeding on the poison material 10. The device being firmly held in the ground will remain in position indefinitely, and even if it should be displaced the poison material 10, being in paste form, will not run out through the holes 9. When the poison material is exhausted, as is evidenced by its failure to attract ants, the entire device is thrown away and a new one substituted for it.

The use of wood as the material from which the body 5 and the plug 11 are made, presents definite advantages. It is not heated to as high a temperature by the sun as is a metal or glass container, and therefore it does not repel ants in the hot part of the day, nor is its temperature sufficient to promote deterioration of the poison material. Moreover, wood is not subject to deterioration during the life of the body of poison material, so that there are no products of deterioration formed which are repellent to ants as is the case with the rusting of iron containers. I prefer to use redwood because of its resistance to decay and the absence from it of aromatic oils which might contaminate the poison material and reduce its attraction for the ants, although any other wood having similar properties will be suitable. In this connection it should be noted that the poison material is contained in a receptacle which is entirely enclosed except for the small entrance holes 9, so that there is little possibility of contamination of said material by outside odors, and, moreover, it will not be diluted or washed away in rainy weather, or by artificially watering of plants in the immediate vicinity.

It is to be noted, moreover, that the construction of the body, together with the use of a poison bait in non-liquid form, permits said material to be placed directly in the cavity of the body, without requiring the use of a separate inner container therefor. Non-fluid poison bait has an added advantage in that the active poison ingredient will not settle out, as is possible in liquids, leaving the bait material ineffective as an insecticide. Furthermore, the construction of the body is such that its outside surfaces are smooth and without projections, whereby it can be easily forced into the ground to the desired depth.

It is sometimes desirable to place a body of ant poison at some distance above the ground to control an infestation of ants in a tall growing plant or shrub. In order to accomplish this object, my invention can be embodied in a flower stake, as illustrated in Fig. 4, wherein the body 5 is provided at its lower end with a dowel 16 by which it is joined to the upper end of a stake member 17. If it is desired to position the poison in the middle portion of the stake instead of at its upper end, the plug which closes the upper end of the body 5 can be formed as a dowel 18 on the lower end of an upper extension 19 of the stake. Except for the means for connecting the body 5 with the upper and lower end portions of the stake, it is exactly the same as in the form shown in Fig. 1. It is formed with the cavity 6 partially filled with the poison material 10 and is provided with the holes 9 at its upper end. The label 13 and sealing strip 14 of Fig. 1 are understood to be applied to the form shown in Fig. 4, although they have been omitted from said Fig. 4 in the drawing.

It will be apparent that the body 5 can be positioned at any point in the length of the stake. For example, in Fig. 3, I have shown it at the bottom, the body 5 in this case being pointed. When incorporated in a flower stake, the cross sectional dimensions of the stake and the container body 5 are preferably the same, so that the entire structure has the outward appearance of an ordinary stake.

I claim:

1. An insect exterminator comprising a body of solid material having a cavity formed by boring into it from one end, a supply of poison material within said cavity, a plug permanently closing the open end of said cavity, and said body having a restricted aperture leading into said cavity.

2. An insect exterminator comprising a wooden body having a hole bored into it from one end to form a cavity, the other end of said cavity being closed, a supply of poison bait material within said cavity, and means for permanently closing the open end of said cavity, said body having a restricted aperture leading thereinto near said closed end.

3. An insect exterminator comprising aligned sections joined together end to end in the form of a flower stake, one of said sections having an interior cavity with an aperture leading thereinto, and a supply of poison bait material within said cavity.

4. An insect exterminator comprising an elongated body in the form of a stake, the lower end of said body being pointed and its exterior surfaces extending smoothly upwardly from said pointed end whereby it may be inserted easily in the ground, said body having an interior cavity with an aperture leading thereinto near its upper end, and a supply of poison bait material within said cavity.

5. An insect exterminator comprising an elongated body in the form of a stake with a pointed lower end, said body having an interior cavity and an aperture leading thereinto near its upper end, a supply of poison bait material within said cavity accessible only through said aperture, and a sheet member secured to the exterior of said body, said sheet member being formed in two separable portions, one portion covering said aperture as a seal therefor and being removable to expose said aperture, the other portion remaining attached to the exterior surface of said body and forming a permanent label therefor.

DONALD G. McIVOR.